2,894,603
REMOVAL OF SOOT FROM ACETYLENE GASES

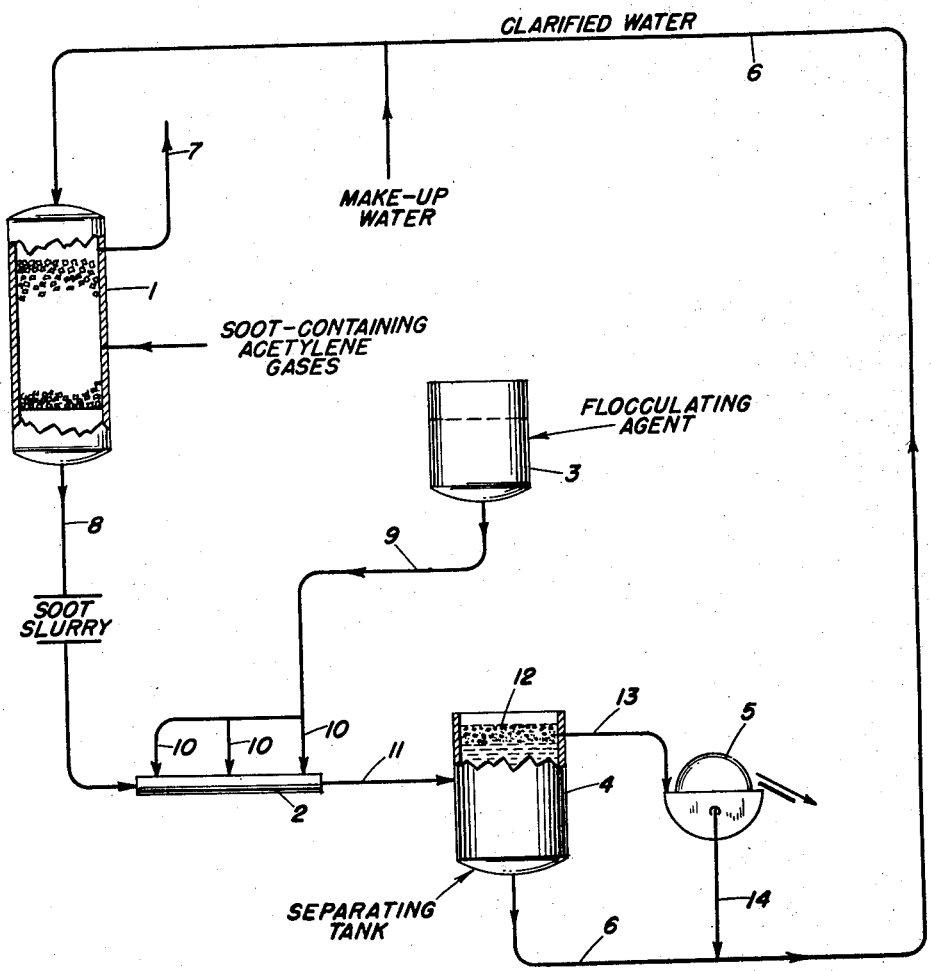

Conjeevaram D. Srini Vasan, Brooklyn, N.Y., assignor to Chemical Construction Corporation, New York, N.Y., a corporation of Delaware Application January 16, 1956, Serial No. 559,448

5 Claims. (Cl. 183—121)

This invention relates to a method for the separation and recovery of finely divided soot from gases and is directed particularly to the separation of soot from water suspensions thereof resulting from the water scrubbing of acetylene-containing gases.

Acetylene is produced commercially by burning aliphatic hydrocarbons such as natural gas with preheated oxygen at flame temperatures of about 1500° C., using an insufficient quantity of oxygen to burn all of the hydrocarbon. The resulting gases are quenched quickly by water sprays to prevent decomposition of the acetylene and are then scrubbed by countercurrent contact with cold water, usually in a packed tower, to remove the finely divided soot that is formed during the combustion. The soot obtained in this process is composed of very small particles of carbon, averaging about 20–30 microns in size, and the separation of this soot from the water presents a difficult problem. Because of its fine particle size, and because its density is not greatly different from that of the water, it can be separated only very slowly by gravity separation procedures. Attempts have been made to settle out the soot by adding wetting agents to the water suspension, but even with large quantities on the order of 0.3% of wetting agent the settling rate is very slow.

The present invention is based on the concept of flocculating the soot particles in the water suspension into agglomerates or aggregates of relatively large size. It has been found that when this is done the aggregates are capable of rising rapidly through the water by flotation and collecting in a relatively dense layer adjacent to the surface thereof. It has been found that all of the flocculated soot particles will separate as a distinct upper layer in as little as 10 seconds when the slurry is allowed to stand in a relatively quiescent condition; this permits a rapid separation and recovery of the soot. It has also been found that the flocculated soot particles are readily dewatered by filtration, centrifuging or other standard dewatering procedures, and after dewatering can be air-dried and burned as fuel or extruded through screw-conveyors into briquettes for other uses.

The invention will be further described with reference to the accompanying drawing, the single figure of which is a flow sheet illustrating a preferred embodiment thereof. On this drawing reference numeral 1 indicates generally a tower in which the soot-containing acetylene gases are scrubbed with water, 2 is a feeding trough for injecting into the slurry a flocculating agent from the feed tank 3, and 4 is a separation tank or decanter wherein the body of slurry is maintained in a relatively quiescent condition for a short time to permit the flocculated soot particles to rise to the surface. 5 is a rotary vacuum filter for removing water from the upper soot layer and 6 is a return line for returning the clarified water to the scrubbing tower 1.

In most commercial acetylene plants there are three separate sources of soot. The first of these is the water sprayed into the burner gases immediately following the acetylene burner to quench these gases and prevent decomposition of the acetylene. The second source is the cooler-scrubber illustrated on the drawing. Following this scrubber the gases leaving through the line 7 are frequently passed through a coke tower wherein any remaining quantities of soot are filtered out by contact with wet coke. This coke is then washed with water and the washings are mixed with the soot slurry in line 8 of the drawing. It will be understood, therefore, that the system shown on the drawing is somewhat simplified, and that the soot slurry in line 8 may contain finely divided carbon from several sources. The exact quantity of soot in the suspension will vary through fairly wide limits, depending on the quantity of soot that is removed from the gases in the quenching step and in the coke filtering step and added to the soot slurry leaving the tower 1 through line 8.

In general, the quantity of soot suspended in the water leaving the tower 1 may vary from as little as 100 parts per million to as much as 2–3%. Soot added from the other sources may increase this concentration to anywhere from 1% to 6% on the weight of the slurry, or higher. It is an important advantage of the invention, however, that the process thereof can be applied for the treatment of soot suspensions containing widely varying quantities of soot; these suspensions may also contain other solids as when impure river water containing considerable quantities of mud is used as the scrubbing liquid. It will be understood, therefore, that the process of the invention is not dependent on the quantity of soot in the suspension.

The temperature of the soot-containing water is likewise only of minor importance. Usually the make-up water is ordinary plant water or impure river water that is supplied at ambient temperatures, which may vary from about 40° F. in cold climates to as much as 90° F. in warm climates. The temperature of this water is raised by the heat of the soot-containing gases, which ordinarily enter the scrubber at about 185° F. or somewhat lower and leave through the line 7 at about 70°–95° F. The temperature of the soot slurry in line 8 may therefore be anywhere between about 100° F. and 185° F. or higher.

A quantity of flocculating agent sufficient to flocculate and agglomerate the suspended soot particles is injected into the soot slurry leaving the tower 1 through line 8, and this injection is preferably made in several separate streams to ensure thorough mixing with the slurry. As is indicated on the drawing, the flocculating agent is preferably stored in a tank 3 and supplied as needed through line 9 to three or more injectors 10 which are preferably spaced some four to six feet apart. These injectors terminate in nozzles below the level of the slurry, and introduce the requisite small quantities of flocculating agent into the slurry as a continuous, uniform feed. The flocculating agent in the tank 3 is preferably a dilute solution of about 1–2% solids and its rate of feed is such that about 20–200 parts per million of the flocculating agent are supplied to the slurry. As will subsequently be explained in detail, a very substantial part of the flocculating agent is recovered in the clarified water that is returned through line 6 to the spray tower, and is therefore available for re-use in flocculating further quantities of soot. This is an important advantage of the complete process of the invention.

After adjusting the quantity of flocculating agent in the slurry to that sufficient to agglomerate the suspended solids at the desired rate the slurry is passed through line 11 into the separating tank 4. Because of the extremely rapid separation rate obtained with the flocculated soot particles, the tank 4 requires only a short residence time and therefore can be of relatively small size. With the indicated quantities of flocculating agent the separation of the soot aggregates requires less than 30 seconds, and is usually complete in about 10–15 seconds, and the lower layer of clarified water can therefore be drawn off through pipe 6 at a relatively rapid rate.

The degree of agglomeration necessary to produce the desired rapid separation of soot aggregates from the water suspension will vary somewhat with the solids content. In most cases, however, aggregates having an average size greater than about 600 microns are capable of rising rapidly through the water by flotation although larger aggregates will of course rise even faster. Accordingly, the most suitable aggregate size represents a compromise between the most rapid rate of separation and the cost of additional flocculating agent to obtain larger aggregates. I have found, however, that flocculated soot particles having an average size of 900–1200 microns can be obtained in a high-ash slurry of 3% solids when approximately 100 parts per million of an effective flocculating agent is maintained in the suspension, and in many cases this represents an optimum operating condition.

It will be understood that the invention in its broader aspects is not dependent on the particular flocculating agent used to convert the finely divided soot particles into aggregates, as a wide variety of known flocculating agents may be used for this purpose. For example, the polyelectrolyte resins described in detail in U.S. Patent No. 2,625,529 as being suitable for improving the tilth of surface solids may be used for my purposes. These polyelectrolyte resins have a weight average molecular weight of at least 10,000 and have a structure derived by polymerization of at least one monoolefinic compound through the aliphatic unsaturated group, said structure being substantially free of cross-linking. I have found, however, that among the many flocculating agents described in this patent those most effective for agglomerating finely divided soot particles in water suspension are the polyelectrolyte linear carbon chain resins of relatively high molecular weight ranging from about 50,000–100,000 as a minimum to about 2,000,000–3,000,000 or more. Such highly polymerized resins are frequently difficult to disperse in water, which is the reason why I prefer to feed them into the soot slurry as a 1–2% aqueous solution and to distribute the feed into the slurry in a number of separated streams. The most effective high molecular weight polymers and copolymers for use in practicing the process of my invention are the partially hydrolyzed polyacrylamides having molecular weights above 50,000 and preferably between about 500,000 and 3,000,000 containing about 2–30% of carboxyl groups or carboxylic acid sodium or ammonium salt groups and about 98–70% of amide groups, the partially hydrolyzed polyacrylonitriles having molecular weights within the range of about 50,000 to 500,000, and the partially hydrolyzed copolymers of acrylamide or acrylonitrile with vinyl esters such as vinyl acetate or with vinyl ethers having molecular weights above about 50,000.

The layer of flocculated soot particles in the separating tank 4 is indicated on the drawing by reference numeral 12. This layer can easily be drawn off by decantation and is passed through line 13 to the filter 5. The slurry filters easily and rapidly on this filter, producing a filter cake containing only about 70% moisture or 7 parts of water to 3 parts of solids. The filtrate is passed through line 14 into the pipe 6 and is preferably returned to the scrubbing tower along with the water drawn off from the bottom of the separating tank 4. This water is preferably cooled to temperatures approximating those of the make-up water in a spray pond, heat exchanger or other cooling system before it is returned. By this procedure about 90% of the water content of the original slurry is recovered for re-use. This constitutes an important saving in the amount of water required for the scrubbing process.

Although the invention has been described and illustrated with reference to the soot-containing gases produced by the high-temperature combustion of natural gas with preheated oxygen, it will be understood that the principles thereof are applicable to soot-containing gases from other sources. In general, therefore, the invention can be applied to any soot-containing gases wherein the soot particles are of a size such that they can be washed from the gases by water scrubbing and where they are sufficiently small so that they cannot readily be separated from water by simple settling procedures.

As an example, a 3% slurry of the soot obtained from an acetylene plant equipped with burners of the type described in U.S. Patent No. 2,195,227 and operating on natural gas and oxygen preheated to 600° C. with a flame temperature of about 1550° C. was treated with 100 parts per million of a flocculating agent. The particular flocculating agent used was a commercial polyacrylamide having a molecular weight in excess of about 2,000,000 and hydrolyzed to contain about 2–10 carboxyl groups for each 98–90 amide group. The flocculating agent was added to the soot slurry as a 1% aqueous solution and distributed uniformly by stirring, after which the slurry was allowed to stand. Within 10 seconds all of the solids were flocculated and a distinct upper layer of soot aggregates was obtained. The lower layer was crystal clear and 60–65% of the total water content could be drawn off while maintaining the upper layer intact. The upper layer was found to contain 32 parts of the water plus 3 parts by weight of solids. On filtering, this produced a filter cake containing 70% moisture.

The filtrate was added to the withdrawn water and the mixture was found to contain about half of the flocculating agent originally added; i.e., about 50 parts per million. This solution was tested as a flocculent for a fresh charge of soot slurry, and was found to produce a flocculation such that the soot particles separated as an upper layer in about 15 seconds.

What I claim is:

1. A method of recovering finely divided soot from gases which comprises scrubbing said gases with water and thereby forming a water suspension of the finely divided soot particles, flocculating the soot particles in said suspension into agglomerates of relatively large size capable of rising rapidly therein by flotation by adding thereto a synthetic water-soluble polyelectrolyte having a weight average molecular weight of at least 10,000 and having a structure derived by the polymerization of at least one monoolefinic compound through the aliphatic unsaturated group, said structure being substantially free of cross-linking, separating the resulting slurry into an upper layer containing the soot aggregates and a lower layer of clarified water, and drawing off and dewatering the upper layer.

2. A method of purifying acetylene gases produced by the high temperature combustion of natural gas with preheated oxygen and containing carbonaceous soot particles averaging 20–30 microns in size which comprises scrubbing said gases with water and thereby forming a water suspension of said soot particles, flocculating the soot particles in said suspension into aggregates having an average size greater than 600 microns and capable of rising rapidly therein by flotation by adding thereto a synthetic water-soluble polyelectrolyte having a weight average molecular weight of at least 10,000 and having a structure derived by the polymerization of at least one monoolefinic compound through the aliphatic unsaturated group, said structure being substantially free of cross-linking, separating the resulting slurry into an upper layer containing the soot aggregates and a lower layer of clarified water, and drawing off and dewatering the upper layer.

3. A method of recovering finely divided soot from gases which comprises scrubbing said gases with water in a gas scrubbing step and thereby forming a water suspension of the finely divided soot particles, flocculating the soot particles in said suspension into agglomerates of relatively large size capable of rising rapidly therein by flotation by adding thereto flocculating amounts of a synthetic water-soluble polyelectrolyte having a weight average molecular weight of at least 10,000 and having a structure derived by the polymerization of at least one monoolefinic compound through the aliphatic unsaturated group, said structure being substantially free of cross-linking, separating the resulting slurry into an upper layer containing the soot aggregates with a portion of said polymer retained therein and a lower layer of clarified water containing the remainder of said polymer, drawing off and dewatering the upper layer and returning water from the lower layer to said gas scrubbing step.

4. A method according to claim 3 in which the polymer is a partially hydrolyzed polyacrylamide having a molecular weight above about 50,000 and containing about 70% to 95% of amide groups.

5. A method according to claim 3 in which the polymer is added by injecting aqueous solutions thereof into a flowing stream of the suspension at a plurality of points spaced from each other in the direction of flow.

References Cited in the file of this patent
UNITED STATES PATENTS

| | | |
|---|---|---|
| 2,213,267 | Baumann et al. | Sept. 3, 1940 |
| 2,625,529 | Hedrick et al. | Jan. 13, 1953 |
| 2,725,985 | Howard et al. | Dec. 6, 1955 |
| 2,740,522 | Aimone et al. | Apr. 3, 1956 |
| 2,757,797 | Eckert et al. | Aug. 7, 1956 |